Patented Dec. 10, 1929

1,738,649

UNITED STATES PATENT OFFICE

CARL N. HAND, THOMAS W. BARTRAM, AND AYLMER H. MAUDE, OF NITRO, WEST VIRGINIA, ASSIGNORS TO THE RUBBER SERVICE LABORATORIES CO., OF AKRON, OHIO, A CORPORATION OF OHIO

MANUFACTURE OF ACETALDEHYDE

No Drawing. Application filed April 12, 1926. Serial No. 101,562.

Our present invention is directed to improvements in the process of manufacturing acetaldehyde by a cyclic and substantially continuous process wherein acetylene is passed through a heated acid solution carrying a reaction catalyst suspended therein. The process will be understood from the following specification wherein the invention is fully set forth and described.

Various processes heretofore have been proposed for the preparation of acetaldehyde from acetylene by the action of the latter on sulfuric or phosphoric acid solutions, containing solutions of various catalysts. However, great difficulty has been experienced in the commercial operation of these earlier processes. Furthermore, the recovery of the aldehyde from the reaction products by the condensation and refrigeration means ordinarily employed has been carried out only at great cost and is always accompanied with losses of the aldehyde.

According to the present invention, it has been found that the manufacture of acetaldehyde can be commercially carried out with great ease and efficiency by operating in a continuous manner, whereby a high yield of aldehyde is realized and the acetylene is transformed into the product desired with the generation of a minimum quantity of undesirable by-products.

In carrying out the process according to this invention, the reaction vessel comprising an acid resistant material, or preferably of ordinary construction, lined with some readily replaceable acid-resisting material, is charged with a quantity of sulfuric acid of any desired strength, although a solution containing from 25 to 30% acid is preferably employed. The acid also carries a quantity of a catalyst of the reaction taking place. Although any suitable catalyst may be employed, we have found that a substance such as mercurous sulfate, that is but slightly soluble in the acid solution used, gives the most favorable results. The proper proportion of catalyst that is required is more fully explained hereinafter.

Acetylene from any source of supply and without any treatment other than the trapping out of any mechanically carried water to avoid undue dilution of the acid, is passed under a pressure of approximately 10 pounds per square inch above atmospheric pressure through the acid-catalyst mixture at a rate of about 100 cubic feet per hour to every cubic foot of sulphuric acid-mercurous sulphate mixture in the reaction vessel. The hydration of acetylene is an exothermic reaction, and although the reaction will proceed in a relatively cool liquid, the change takes place much more readily at higher temperatures, for example from 68 to 80° C. It is, then, desirable when first starting the operation, to introduce into the reaction vessel a sufficient quantity of steam to heat the mixture to a temperature of approximately 68° C. The quantity of acid employed, and the proportion of catalyst taken, are so chosen that the heat evolved in the reaction will maintain the temperature between the limits mentioned. If the temperature begins to fall, it is an indication that the rate of hydration of the acetylene is decreasing, whereupon a sufficient quantity of fresh catalyst is added to the acid solution to bring the temperature back to about 75° C. Although the temperatures mentioned are not intended to indicate limits outside of which no reaction would take place, yet they have been found to comprise the most efficient range of temperature for the acid strength and catalyst particularly mentioned.

Operating under the conditions set forth, approximately 15% of acetaldehyde is produced by each passage of a given quantity of acetylene through the reaction vessel. The gas, carrying vapors of acetaldehyde, is passed through a reflux condenser, functioning as a fractionating column, and cooled to approximately 40° C. and preferably lined with some acid-resistant material, thence through a trap containing coke, unglazed brick or porcelain or other like material to remove any traces of acid mechanically carried by the vapors, and then through a second condenser cooled by a stream of water to a temperature of approximately 21 to 30° C., that is, slightly above the boiling point of the acetaldehyde. Although all traces of acid are ordinarily completely removed from the product by the means already described, it is desirable to pass the cooled mixture of vapors and gases from the second condenser through a second trap also filled with a baffling material, such as coke, unglazed brick and the like.

The greatest obstacle in the way of the successful commercial production of acetaldehyde from acetylene has been the relatively high losses resulting from the attempted condensation and redistillation of the aldehyde vapors. This difficulty we avoid by passing the mixture of aldehyde and acetylene through a series of reaction vessels containing a material that will combine with the aldehyde, preferably by forming a condensation or addition product therewith, but which will not react with the acetylene. By this method of operating, the aldehyde is removed from the mixture and the acetylene is returned to the reaction vessel, preferably by a blower or other suitable means to be contacted again with the acid and catalyst, and thereby to produce a further quantity of acetaldehyde. The method of separating the aldehyde from the acetylene is more specifically described and claimed in another Patent No. 1,696,479 filed by one of us on April 12, 1926.

It is found that as the formation of aldehyde proceeds from the acetylene, the acid solution in the reaction chamber becomes contaminated with an increasing quantity of polymerized materials and organic side-reaction products so that the reaction no longer proceeds in an efficient manner. It is then, desirable from time to time as necessity requires, to withdraw the contents from the reaction vessel and charge again with fresh acid containing a quantity of catalyst as already described. The mercury containing material in the spent acid liquor is recovered therefrom, and converted into fresh catalyst by any satisfactory process. The replacement of the acid solution with a fresh charge of acid has been found to be necessary only after from forty-eight to seventy-two hours of continuous operation.

From the foregoing description, it will be evident that the process is continuous in every respect and may be carried out readily and conveniently on a commercial scale. There is practically no loss of actylene and by means of the method employed for the recovery of the aldehyde produced, no appreciable loss of the product results and consequently the actylene is substantially completely converted into aldehyde. Inasmuch as an excess of acetylene is passing through the reaction vessel, this is useful in sweeping away from the reaction zone all of the aldehyde produced, as quickly as it is formed, and before it has time or opportunity to reduce any appreciable proportion of polymerization or other reaction products.

It is to be understood that the foregoing description is given by way of example only, and that the invention is not limited to the particular details set forth, since departure within certain limits as explained, may be made to adjust the process to different conditions arising during the reaction. However, the various limits as mentioned, are most desirable for the production of the large yield of aldehyde indicated by operation of the continuous process as described.

What we claim is:

1. The process for the manufacture of acetaldehyde which comprises heating a solution of from 25 to 30% sulfuric acid to a temperature of approximately 68° C. flowing a stream of acetylene at a pressure substantially 10 pounds above atmospheric pressure through said acid solution, adding to the acid a sufficient quantity of mercurous sulphate to maintain the temperature of the acid-catalyst mixture at from 68 to 80° C., removing entrained water and acid from the mixture of acetylene and acetaldehyde so obtained, separating the acetaldehyde from the mixture of aldehyde and acetylene, and returning the acetylene to the acid solution for further reaction therewith.

2. In the process according to claim 1, the step comprising flowing the acetylene gas through the acid-catalyst mixture at approximately the rate of 100 cubic feet of acetylene per hour to each cubic foot of acid-catalyst mixture employed.

In testimony whereof we affix our signatures.

CARL N. HAND.
THOMAS W. BARTRAM.
AYLMER H. MAUDE.